(12) United States Patent
Leone et al.

(10) Patent No.: US 9,002,627 B2
(45) Date of Patent: Apr. 7, 2015

(54) METHOD AND SYSTEM FOR IMPROVING ENGINE STARTING

(75) Inventors: Thomas G. Leone, Ypsilanti, MI (US); Ralph Wayne Cunningham, Milan, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 881 days.

(21) Appl. No.: 13/227,670

(22) Filed: Sep. 8, 2011

(65) Prior Publication Data

US 2013/0066539 A1    Mar. 14, 2013

(51) Int. Cl.
| | |
|---|---|
| G06F 19/00 | (2011.01) |
| G06G 7/70 | (2006.01) |
| F02N 11/08 | (2006.01) |
| F02D 41/06 | (2006.01) |
| F02D 29/02 | (2006.01) |
| F02D 41/00 | (2006.01) |
| F02D 13/02 | (2006.01) |
| F02B 75/12 | (2006.01) |

(52) U.S. Cl.
CPC .......... *F02D 41/062* (2013.01); *F02D 13/0215* (2013.01); *F02D 13/0265* (2013.01); *F02D 29/02* (2013.01); *F02B 2075/125* (2013.01); *F02D 41/0002* (2013.01); *F02D 2200/602* (2013.01); *F02D 2250/18* (2013.01); *Y02T 10/42* (2013.01)

(58) Field of Classification Search
CPC .... F02D 41/0002; F02D 41/062; Y02T 10/42
USPC ............ 123/179.4, 179.16, 179.18, 308, 336, 123/337, 376, 403, 442, 198 DB, 198 DC, 123/198 F, 325, 332, 481, 179.3, 306, 432; 701/112, 113, 102, 103, 104
See application file for complete search history.

(56) References Cited

U.S. PATENT DOCUMENTS

| | | | |
|---|---|---|---|
| 5,542,388 | A | 8/1996 | Ichinose et al. |
| 5,596,957 | A | 1/1997 | Ichinose et al. |
| 5,632,249 | A | 5/1997 | Sadakane et al. |
| 6,543,220 | B2 | 4/2003 | Yoshida et al. |
| 6,622,486 | B2 | 9/2003 | Järvi |
| 6,675,768 | B2 | 1/2004 | Kanai |

(Continued)

FOREIGN PATENT DOCUMENTS

| | | |
|---|---|---|
| EP | 0573895 A1 | 12/1993 |
| EP | 1306829 A2 | 5/2003 |
| JP | 8109836 A | 4/1996 |

OTHER PUBLICATIONS

Donald J. Lewis., "Method and System for Adjusting Port Throttles," U.S. Appl. No. 13/227,680, filed Sep. 8, 2011, 45 pages.

(Continued)

*Primary Examiner* — Mahmoud Gimie
*Assistant Examiner* — Sizo Vilakazi
(74) *Attorney, Agent, or Firm* — Julia Voutyras; Alleman Hall McCoy Russell & Tuttle LLP

(57) ABSTRACT

An engine system and method for improving engine starting are disclosed. In one example, engine port throttles are adjusted differently during automatic and operator initiated engine starts. The system and method may improve engine torque control during an engine start.

18 Claims, 5 Drawing Sheets

(56) References Cited

U.S. PATENT DOCUMENTS

| | | | |
|---|---|---|---|
| 6,915,788 B2 | 7/2005 | Nakamura | |
| 7,347,183 B2 | 3/2008 | Tabata et al. | |
| 8,176,904 B2* | 5/2012 | Shiomi et al. | 123/585 |
| 2002/0174850 A1* | 11/2002 | Kanai | 123/336 |
| 2003/0217739 A1 | 11/2003 | Saeki et al. | |
| 2004/0237931 A1 | 12/2004 | Okamoto et al. | |
| 2008/0184705 A1 | 8/2008 | Dumas et al. | |
| 2010/0114461 A1* | 5/2010 | Gibson | 701/112 |
| 2010/0114462 A1* | 5/2010 | Gibson et al. | 701/113 |
| 2012/0010802 A1* | 1/2012 | Ma et al. | 701/113 |
| 2013/0066540 A1* | 3/2013 | Lewis et al. | 701/113 |

OTHER PUBLICATIONS

Kapus, P.E. et al., "Ethanol Direct Injection on Turbocharged SI Engines—Potential and Challenges," SAE Technical Paper Series 011408, World Congress, Detroit, MI., Apr. 16-19, 2007, 11 pages.

Colpin, C. et al., "Key Parameters for Startability Improvement Applied to Ethanol Engines," SAE Technical Paper Series No. 010616, Renault SAS, 2009, 9 pages.

Nakajima, Susumu, "Research into Optimal Specifications for Flexible Fuel Vehicle Engines," SAE Technical Paper Series No. 011097, Honda R&D Co., Ltd, 2010, 10 pages.

Colli, Gustavo Beira et al., "Heated Injector Cold Start System for Flex-Fuel Motorcycles," SAE Technical Paper Series No. 360156, Congresso 2010 SAE Brasil, São Paulo, Brasil, Oct. 5-7, 2010, 19 pages.

Leone, Thomas G. et al., "Pulsation Absorption System for an Engine," U.S. Appl. No. 13/290,728, filed Nov. 7, 2011, 31 pages.

Leone, Thomas G. et al., "Method and System for Sampling Intake Manifold Pressure," U.S. Appl. No. 13/231,170, filed Sep. 13, 2011, 39 pages.

Leone, Thomas G. et al., "Method and System for Improving Engine Starting," U.S. Appl. No. 13/326,150, filed Dec. 14, 2011, 48 pages.

* cited by examiner

METHOD AND SYSTEM FOR IMPROVING ENGINE STARTING

BACKGROUND/SUMMARY

Vehicle fuel economy may be extended by stopping an internal combustion engine of the vehicle during vehicle stops. Instead of continuing to consume fuel at idle conditions where limited amounts of useful work may be done, an engine may be stopped so as to conserve fuel until vehicle motion or acceleration are desired. Of course, the vehicle engine may be stopped and started via dedicated operator engine stop and engine start requests. However, a vehicle operator may soon tire of inputting engine stop and start requests.

Another way to conserve fuel by stopping the engine includes automatically stopping and starting the engine absent dedicated operator initiated engine stop and engine start requests or commands. However, if an engine is automatically stopped and started, precise engine speed control during engine start and run-up to idle speed may be desirable to reduce transmission of engine torque to vehicle wheels. Nevertheless, precise engine speed control during engine start and run-up may be particularly difficult to achieve because the engine intake manifold is at or near atmospheric pressure during an engine start. Consequently, engine cylinders may induct a large air charge that requires a corresponding increase in fuel charge to reduce maintain stoichiometry for improved efficiency of the exhaust aftertreatment system. As a result, engine speed may increase to a level where an increased amount of engine torque may be transferred through a transmission torque converter and to vehicle wheels. The amount of speed and torque increase may be reduced with spark retard, but combustion stability and other factors may limit the amount of spark retard that may be applied. Additionally, a way of controlling cylinder air charge during an automatic engine start may not be suitable for an operator directed engine start because different masses may be coupled to the engine during an automatic engine start as compared to an operator directed engine start.

The inventors herein have recognized the above-mentioned limitations and have developed a method of starting an engine, comprising: positioning an air inlet throttle for an engine start; during an operator directed engine start, positioning a port throttle in a first position, the port throttle positioned downstream of the air inlet throttle in an air intake system of the engine; and positioning the port throttle in a second position during an automatic engine start, the automatic engine start not requested directly by an operator.

By adjusting port throttles and by providing different port throttle adjustments during operator and automatic starts, it may be possible to improve cylinder air charge control during engine starting. For example, port throttles may be partially opened during automatic engine starts to limit cylinder air charge, thereby controlling engine speed during engine starting and run-up (e.g., the period between engine cranking and when the engine reaches idle speed). The same port throttles may be opened further during an operator directed engine start so that engine speed may increase more rapidly during conditions where engine torque is less likely to be transmitted to vehicle wheels. In this way, port throttles may be adjusted to improve automatic and operator directed engine starts.

The present description may provide several advantages. For example, the approach may provide more precise engine speed control during automatic engine starting. Further, the approach may provide robust engine run-up during operator directed engine starting by allowing additional air to flow to the engine as compared with during automatic engine starts. Further still, in some examples, the approach may allow port throttles to be controlled in response to transmission operating conditions, thereby accounting for different masses that may be coupled to the engine during automatic and operator directed engine starts.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
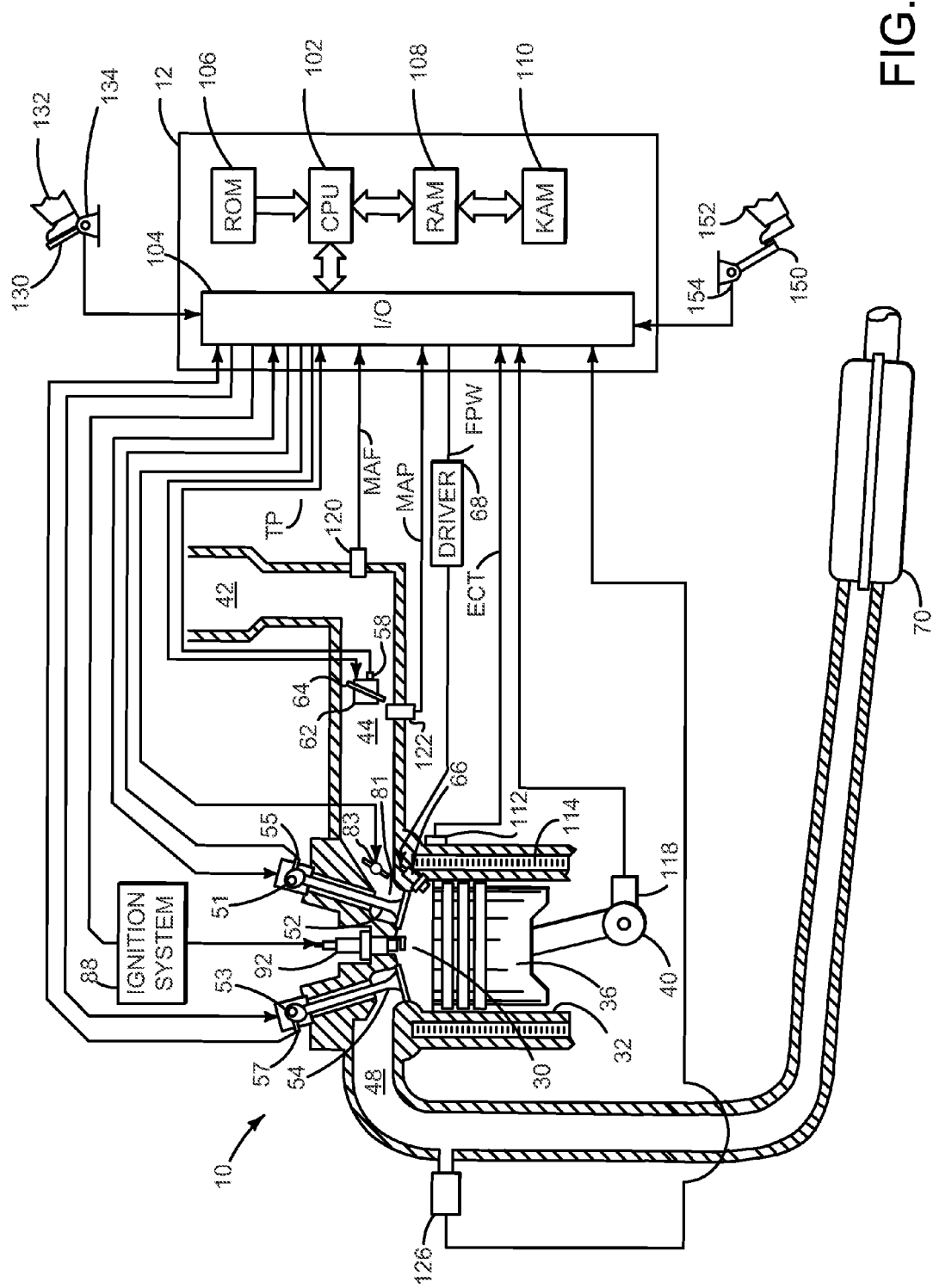
FIG. 1 shows a schematic depiction of an engine.
Figure 2:
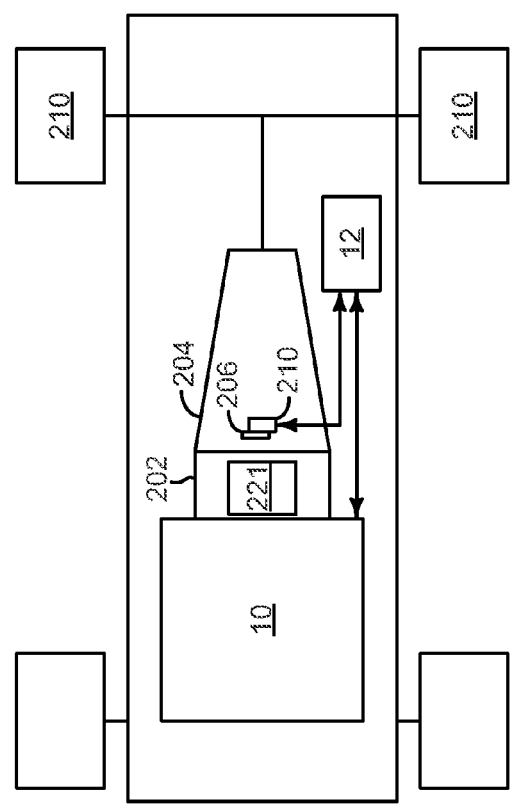
FIG. 2 shows a schematic depiction of a vehicle.
Figure 3:
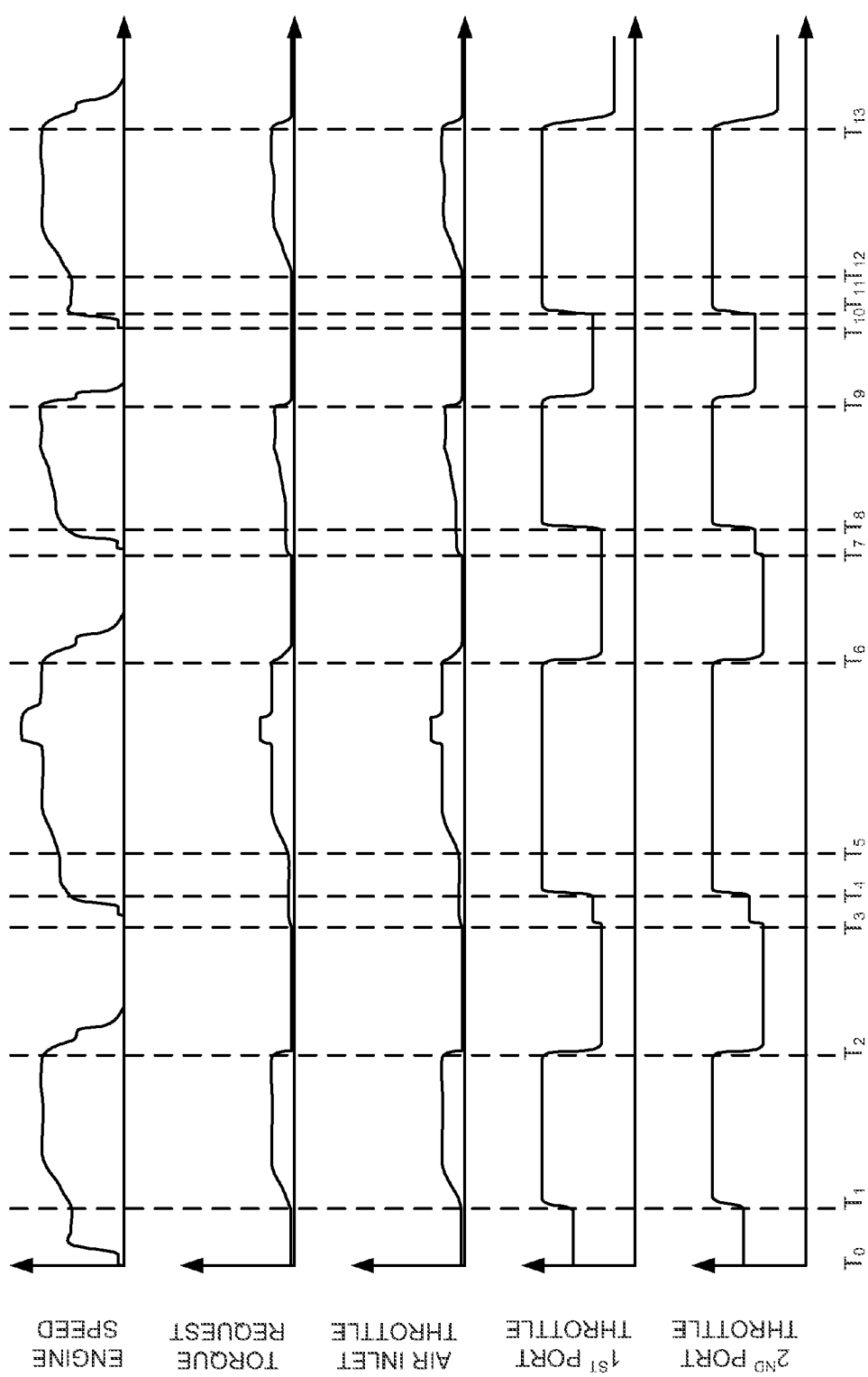
FIGS. 3 and 4 show a simulated example of an engine operating sequence during operator directed and automatic engine starting.
Figure 4:
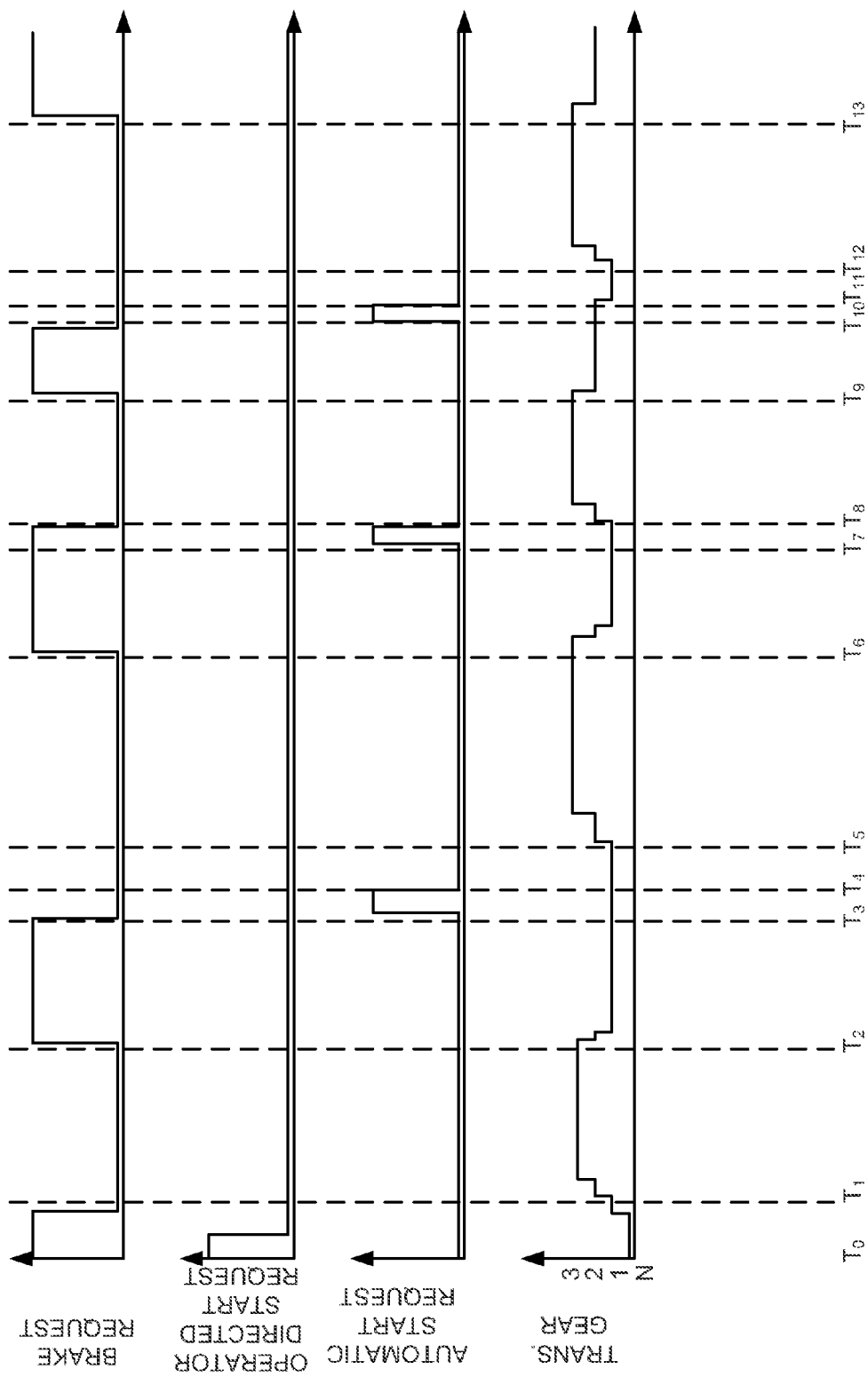

The present description is related to controlling port throttles of an engine placed in a vehicle as illustrated in FIGS. 1 and 2. In one example, port throttles are adjusted differently for automatic engine starts and operator directed engine starts as illustrated in FIGS. 3 and 4. Port throttles may be controlled according to the method of FIG. 5 to provide the sequence illustrated in FIGS. 3 and 4.

Referring to FIG. 1, internal combustion engine 10, comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 40. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57.

Fuel injector 66 is shown positioned to inject fuel directly into cylinder 30, which is known to those skilled in the art as direct injection. Alternatively, fuel may be injected to an intake port, which is known to those skilled in the art as port injection. Fuel injector 66 delivers liquid fuel in proportion to the pulse width of signal FPW from controller 12. Fuel is delivered to fuel injector 66 by a fuel system (not shown) including a fuel tank, fuel pump, and fuel rail (not shown). Fuel injector 66 is supplied operating current from driver 68 which responds to controller 12. In addition, intake manifold 44 is shown communicating with optional electronic throttle 62 which adjusts a position of throttle plate 64 to control air flow from engine air intake 42. Port throttle 83 controls air flow into cylinder 30 via restricting or opening intake port 81. In engines with a plurality of cylinders a plurality of individually controlled port throttles may be provided so that port throttle of a first cylinder may be positioned differently from port throttles of another cylinder.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst in one example.

Vehicle brakes may be applied when foot 152 depresses brake pedal 150. Brake pedal position sensor 154 indicates the position of brake pedal 150 and may be used to determine whether or not vehicle brakes are applied.

Controller 12 is shown in FIG. 1 as a conventional microcomputer including: microprocessor unit 102, input/output ports 104, read-only memory 106, random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing accelerator position adjusted by foot 132; a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120 (e.g., a hot wire air flow meter); and a measurement of throttle position from sensor 58. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

In some examples, the engine may be coupled to an electric motor/battery system in a hybrid vehicle. The hybrid vehicle may have a parallel configuration, series configuration, or variation or combinations thereof. Further, in some embodiments, other engine configurations may be employed, for example a diesel engine.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion. During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is described merely as an example, and that intake and exhaust valve opening and/or closing timings may vary, such as to provide positive or negative valve overlap, late intake valve closing, or various other examples.

Referring now to FIG. 2, a schematic depiction of a vehicle including the engine 10 of FIG. 1 is shown. Vehicle 200 includes engine 10 coupled to a transmission 204 via a torque converter 202. Engine 10 provides torque to vehicle wheels 210 via transmission 204 and through torque converter 202. Controller 12 receives signals from and provides control signals to engine 10 and transmission 204. Controller 12 actuates torque converter lock-up clutch 221, and gears 206 that are selectable via clutches 210. In one example, clutches 210 are hydraulically operated.

Referring now to FIGS. 3 and 4, a simulated engine operating sequence is illustrated. The sequence of FIGS. 3 and 4 may be provided via the system of FIGS. 1 and 2 by way of controller 12 executing instructions of the method of FIG. 5. FIGS. 3 and 4 represent operating signals during a same operating sequence. Therefore, vertical time markers $T_0$-$T_{13}$ represent the same times in both of FIGS. 3 and 4.

The first plot from the top of FIG. 3 represents engine speed versus time. The Y axis represents engine speed and engine speed increases in the direction of the Y axis arrow. The X axis represents time and time increases from the left hand side of FIG. 3 to the right hand side of FIG. 3.

The second plot from the top of FIG. 3 represents engine torque request versus time. The Y axis represents engine torque request and engine torque request increases in the direction of the Y axis arrow. The X axis represents time and time increases from the left hand side of FIG. 3 to the right hand side of FIG. 3.

The third plot from the top of FIG. 3 represents position of engine air inlet throttle versus time. The Y axis represents position of an engine air inlet throttle and opening amount of the engine air inlet throttle increases in the direction of the Y axis arrow. The X axis represents time and time increases from the left hand side of FIG. 3 to the right hand side of FIG. 3.

The fourth plot from the top of FIG. 3 represents position of a first engine port throttle versus time. The Y axis represents position of the first engine port throttle and opening amount of the first engine port throttle increases in the direction of the Y axis arrow. The X axis represents time and time increases from the left hand side of FIG. 3 to the right hand side of FIG. 3.

The fifth plot from the top of FIG. 3 represents position of a second engine port throttle versus time. The Y axis represents position of the second engine port throttle and opening amount of the second engine port throttle increases in the direction of the Y axis arrow. The X axis represents time and time increases from the left hand side of FIG. 3 to the right hand side of FIG. 3.

The first plot from the top of FIG. 4 represents vehicle brake request versus time. The Y axis represents vehicle brake request and vehicle brake request increases in the direction of the Y axis arrow. The X axis represents time and time increases from the left hand side of FIG. 4 to the right hand side of FIG. 4.

The second plot from the top of FIG. 4 represents an indication or absence of an indication of an operator directed engine start request. An operator directed engine start request is indicated when the signal is at a higher level. Absence of an operator directed engine start request is indicated when the signal is at a lower level. A lower level operator directed engine start signal is near the X axis. The X axis represents time and time increases from the left hand side of FIG. 4 to the right hand side of FIG. 4.

The third plot from the top of FIG. 4 represents an indication or absence of an indication of an automatic engine start request. An automatic engine start request is indicated when the signal is at a higher level. Absence of an automatic engine start request is indicated when the signal is at a lower level. A lower level automatic engine start signal is near the X axis. The X axis represents time and time increases from the left hand side of FIG. 4 to the right hand side of FIG. 4.

The fourth plot from the top of FIG. 4 represents transmission gear of a transmission coupled to the engine. Neutral in indicated by N along the Y axis and gears 1-3 are indicated by appropriate numbers. The Y axis represents transmission gear and the gear numbers increase in the direction of the Y axis arrow. The X axis represents time and time increases from the left hand side of FIG. 4 to the right hand side of FIG. 4.

At time $T_0$, engine cranking begins in response to an operator directed engine start request. The engine speed begins to increase and the operator directed engine start signal is at an elevated level. The vehicle brake is also applied and the transmission is in neutral. In some examples, an operator directed engine start request may only be allowed when the transmission is in neutral or park. The engine torque request is also low at time $T_0$ and the engine air inlet throttle is closed to a lower opening amount. The first and second port throttles are opened to a middle level so as to provide some restriction to air entering the cylinder ports. The first and second port throttle positions may be further adjusted during operator directed engine starts to account for changes in engine temperature and friction. For example, engine port throttle opening amounts can be increased as engine temperature at time of start decreases so as to accelerate a cold engine with higher friction.

Between time $T_0$ and time $T_1$, the engine is started and achieves idle speed. The operator directed starting signal also transitions to a lower level indicating an end to the operator directed engine start request. The brake request is also removed so that the vehicle may travel forward and the transmission is transitioned from neutral to first gear.

At time $T_1$, the engine torque request is increased by the vehicle operator or a hybrid controller so that the vehicle can accelerate. The engine air inlet throttle opening is also increased so that additional air is provided to the engine, thereby providing increased engine torque. The first and second port throttles are fully opened so as to reduce restriction of the cylinder inlet ports. By increasing the opening of the engine air inlet throttles and port throttles, engine torque output can be increased.

Between time $T_1$ and time $T_2$, the engine and vehicle accelerate. As the vehicle accelerates, the transmission shifts from first gear up to third gear. The engine speed stabilizes at a higher level and the engine torque request and opening amount of the port throttles remain substantially constant near time $T_2$.

At time $T_2$, the engine torque request is reduced and the engine speed begins to fall with the reduced engine torque demand. The engine air inlet throttle opening amount is also decreased as the engine torque request is decreased. The low engine torque demand also allows the first and second port throttles to partially close since engine and cylinder air amount is reduced. In this example, the engine torque request is reduced to a low level which allows the first and second port throttles to be positioned for a subsequent engine restart during conditions where the engine is stopped. Further, the second port throttle is closed more than the first port throttle because the cylinder receiving air from the first port throttle is predicted to be the first cylinder to induct air from engine stop based on the engine stopping position.

Between time $T_2$ and time $T_3$, the engine speed is reduced until the vehicle is stopped where the engine briefly idles and then is subsequently automatically stopped. In one example, the engine may be automatically stopped when the vehicle brake is applied, when vehicle speed is less than a threshold level, and when the engine torque request is less than a threshold level. Further, additional conditions may be required to automatically stop the engine. The first and second port throttles are prepositioned for a subsequent automatic engine start. For example, based on the transmission gear at engine stop, a position of the port throttles may be extracted from a table of empirically determined port throttle positions. In this example, the first and second port throttle positions are based on the transmission being in first gear. In some examples, the first and second port throttles may also be adjusted just prior to engine cranking during an automatic engine start so that operating conditions that may have changed during the engine off state may be accounted for in the positioning of the first and second port throttles.

The vehicle brakes are also applied during the period between time $T_2$ and time $T_3$. The vehicle brake can be applied to keep the vehicle still while the vehicle is stopped and to keep the engine off since the engine may be restarted if the vehicle brake is released. It should be noted that where an actuator provides more than one function (e.g., vehicle braking and condition for engine restart), adjustment of the actuator by the vehicle operator does not constitute an operator directed engine start request. The transmission is also downshifted from third gear to first gear between time $T_2$ and time $T_3$.

At time $T_3$, the vehicle brake is released as indicated by the brake request transitioning to a lower level. The engine is restarted automatically as the automatic start request signal transitions to a higher level. The operator directed start signal remains at a low level since the engine start is not operator directed. At substantially the same time, the engine torque request is increased by a small amount. The opening amounts of the first and second port throttle is also adjusted in response to the engine torque request. In this example, the first port throttle opening amount is increased by a first amount to allow additional air to enter engine cylinders, thereby providing additional vehicle launch torque as the engine runs-up. Since the driver is requesting increased engine torque at the time of start, it may be expected that the driver expects additional torque transfer to vehicle wheels during engine run-up. Additionally, the second port throttle opening amount is increased by an amount greater than the first port throttle opening amount to account for less air pressure in the engine intake manifold caused by air entering the cylinder in communication with the first port throttle.

In some examples, the port throttle positions may be adjusted in response to a counted number of cylinder events (e.g., combustion events or air induction events since the engine was stopped). By increasing the opening amount of the second port throttle, a cylinder in communication with the second port throttle may receive an air amount similar to the cylinder in communication with the first port throttle. Thus, in this example, the cylinder in communication with the first port throttle receives a first inducted amount of air related to the position of the first port throttle and engine intake manifold pressure (MAP). Subsequently, the cylinder in communication with the second port throttle receives a second inducted amount of air related to the position of the second port throttle and MAP, the second induced amount substantially the same as the first inducted air amount or in proportion to the first inducted air amount. In this way, individual cylinders may receive substantially similar air amounts or air amounts in proportion to the first amount of air inducted to the first cylinder to induct air since engine stop during engine cranking and run-up.

At time $T_4$, engine speed reaches an engine idle speed and the first and second port throttles are substantially fully opened to allow engine torque to increase in response to the operator torque request. The automatic start request also transitions to a low level indicating that the engine is started. The engine torque request and the engine air inlet throttle positions remain substantially constant.

At time $T_5$, the engine torque request is increased causing the engine speed to increase as well as the engine air inlet throttle opening amount. The transmission shifts through gears as vehicle speed increases.

Between time $T_5$ and time $T_6$, engine speed and the engine torque request vary in response to operator demands. The engine air inlet throttle position also changes with the engine torque request.

At time $T_6$, the engine torque request is reduced and the engine speed begins to lower with the reduced engine torque demand. The engine air inlet throttle opening amount is also decreased as the engine torque request is decreased. The low engine torque demand also allows the first and second port throttle to partially close since engine and cylinder air amount is reduced. The first and second port throttles are also closed because the engine torque request is low.

Between time $T_6$ and time $T_7$, the engine speed is reduced until the vehicle is stopped where the engine briefly idles and then is subsequently automatically stopped. The vehicle brakes are also applied during the period after time $T_6$, and the transmission is also downshifted from third gear to first gear after time $T_6$. The first and second port throttles are prepositioned for a subsequent automatic engine start. The first port throttle is closed further than the second port throttle since the cylinder receiving air via the first throttle is predicted to be the first cylinder to induct air since engine stop based on the engine stopping position. The first and second port throttles are also prepositioned for a subsequent automatic engine start based on the transmission being in first gear.

At time $T_7$, the engine torque request is increased causing the automatic engine start request to transition to a high level so that the engine is cranked and restarted. However, the vehicle brake is also applied when the engine torque request is increased. The position of the port throttles is reduced in response to vehicle brakes being applied so as to limit engine torque. Thus, where there may be conflicting requirements between a vehicle brake request and engine torque request, the first and second port throttle openings can be reduced as compared to similar condition except where the vehicle brake is not applied. In this way, engine torque can be limited via the first and second port throttles. The port throttles may also be adjusted based on a counted number of cylinder events.

At time $T_8$, the engine speed reaches a desired engine speed and the vehicle brakes are released as indicated by the brake request transitioning to a lower state. Since the brake is released the port throttles can be opened to allow additional air to engine cylinders. Further, since the engine has reached idle speed the port throttles can be opened so that the engine responds quickly to the engine torque request. The automatic start request signal also transitions to a lower state when the engine speed reaches the idle speed. The engine torque request is also increased near time $T_8$ and the engine accelerates propelling the vehicle and causing the transmission to shift through gears.

At time $T_9$, the engine torque request is reduced and the engine speed begins to lower with the reduced engine torque demand. The engine air inlet throttle opening amount is also decreased as the engine torque request is decreased. The low engine torque demand also allows the first and second port throttle to partially close since engine and cylinder air amount is reduced. The first and second port throttles are also closed since the engine torque request is low.

Between time $T_9$ and time $T_{10}$, the engine speed is reduced until the vehicle is stopped where the engine briefly idles and then is subsequently automatically stopped. The vehicle brakes are also applied during the period after time $T_9$, and the transmission is also downshifted from third gear to second gear after time $T_9$. The first and second port throttles are prepositioned for a subsequent automatic engine start. The first port throttle is closed further than the second port throttle since the cylinder receiving air via the first throttle is predicted to be the first cylinder to induct air since engine stop based on the engine stopping position. The first and second port throttles are also prepositioned for a subsequent automatic engine start based on the transmission being in second gear. The transmission may select different gears to be engaged during engine starting based on engine operating conditions. By selecting to leave the transmission in second gear, the engine may experience an increased perceived inertia as compared to when the engine is started while the transmission is in first gear. Therefore, in some examples, additional air can be provided to the engine cylinders by increasing the opening amount of the port throttles as is shown between time $T_9$ and time $T_{10}$ as compared to the time between $T_6$ and $T_7$. In other examples, the opening amount of the port throttles may be reduced for higher gear ratios and decreased for lower gear ratios. The brake is also released just prior to time $T_{10}$.

At time $T_{10}$, the automatic start request is transitioned to a higher level and engine cranking begins. The engine torque request and engine air inlet throttle position remain at their positions as there is no engine torque request from the vehicle operator. The first and second port throttles are shown set at a level higher than the levels set between time $T_6$ and time $T_7$ and remain at the higher level during engine cranking. The position of the first and second port throttles may be further adjusted in response to barometric pressure at time of start. In one example, barometric pressure is used to index a table of empirically determined port throttle offset values that are added to the base port throttle position in order to compensate for barometric pressure.

At time $T_{11}$, the speed of the engine reaches idle speed and the automatic start request is transitioned to a lower level. The transmission is also downshifted to first gear to improve vehicle acceleration and the port throttles are fully opened to allow engine torque to increase in anticipation of an operator increase the engine torque demand. The engine torque request is low since there is no operator request for torque. The engine air inlet throttle position is also low since there is no operator torque request.

At time $T_{12}$, the operator increases the engine torque request causing the engine speed to increase and the vehicle to accelerate. The transmission is upshifted in response to the increasing vehicle speed. The engine air inlet throttle opening is also increased to provide the engine additional air for increasing engine torque.

At time $T_{13}$, the engine torque request is reduced and the engine and vehicle begin to decelerate. The vehicle brake is applied shortly after time $T_{13}$ and the transmission is downshifted as vehicle speed decreases. The engine is also stopped shortly after time $T_{13}$.

Figure 5:
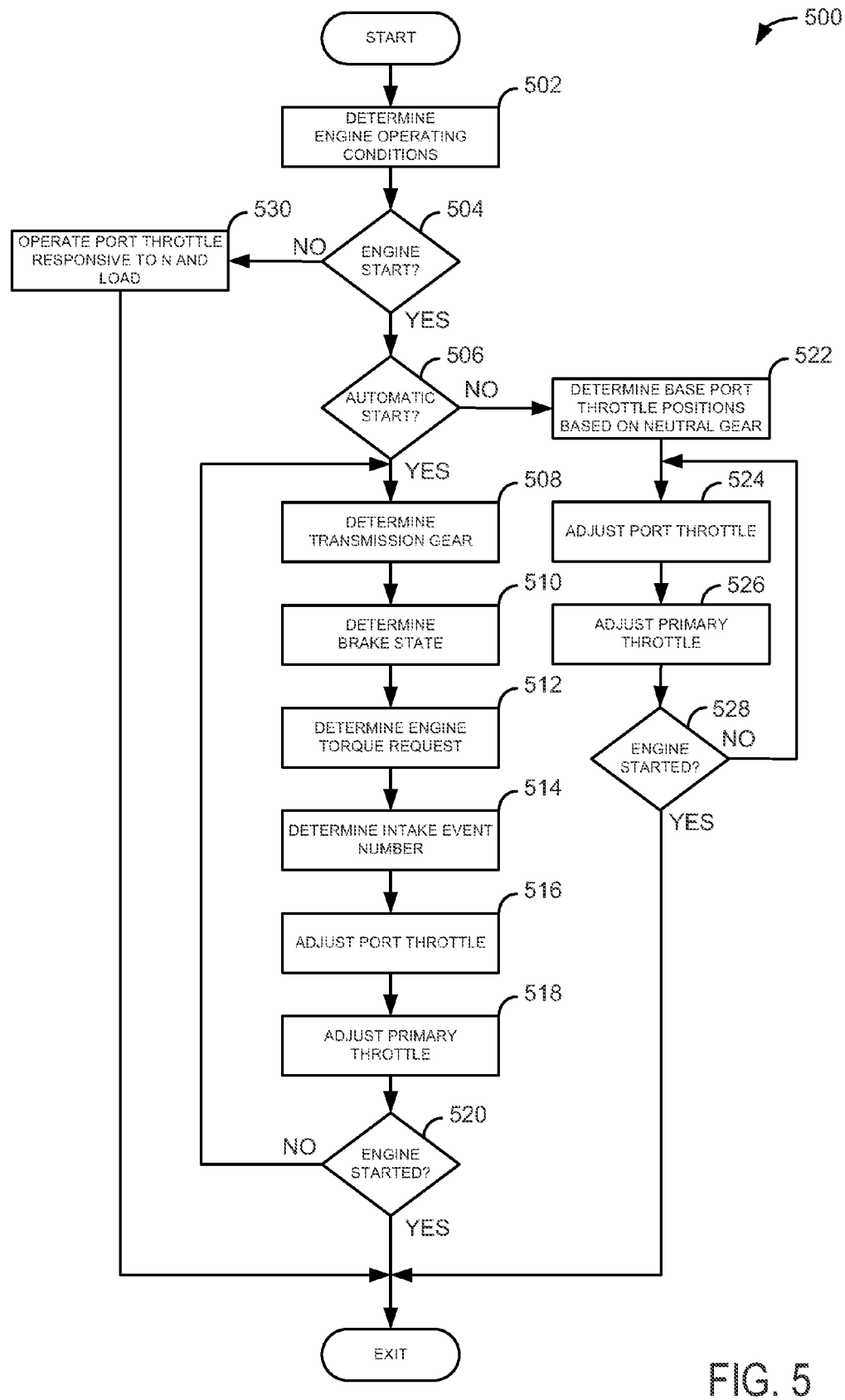
FIG. 5 shows a flowchart of an example method for operating an engine.

Referring now to FIG. 5, a flowchart of an example method for operating an engine is shown. The method of FIG. 5 may be executed via instructions of controller 12 in the system of FIGS. 1 and 2. Further, the method of FIG. 5 may provide the sequence illustrated in FIGS. 3 and 4.

At 502, method 500 determines engine operating conditions. Engine operating conditions may be determined via sensors and actuators illustrated in FIGS. 1 and 2. Engine operating conditions may include but are not limited to engine speed, engine load, engine temperature, transmission temperature, selected transmission gear, engaged transmission gear, and operator torque demand. Method 500 proceeds to 504 after engine operating conditions are determined.

At 504, method 500 judges whether or not the engine is presently being started. In one example, it may be determined that the engine is being started when a starter is engaged. In other examples, engine starting may be determined when the engine is being rotated via an external source such as an electric motor of a hybrid vehicle. In still other examples, engine starting may be indicated by initiation of fuel injection after an engine stop. If method 500 judges that the engine is being started, method 500 proceeds to 506. Otherwise, it is determined that the engine is not being started and method 500 proceeds to 530.

At 530, method 500 operates engine port throttles in response to engine speed and load. The engine system may include a plurality of port throttles directing air to a plurality of cylinders. Each of the plurality of port throttles may be individually controlled. For example, port throttles of some cylinders may be partially closed while port throttles of other cylinders may be fully open. Thus, air flow to different cylinders may be controlled in different ways. In one example, engine speed and load are used to index a table of empirically determined port throttle positions. The output of the table is a port throttle position that may be set by the controller. In addition, barometric pressure and engine air inlet temperature may be used to index tables that output offsets to further adjust the position of port throttles. For example, if engine air intake temperature increases port throttles may be opened further to compensate for the change in air density. Method 500 proceeds to exit after the port throttle positions are adjusted.

At 506, method 500 determines whether or not the engine is being automatically started. An engine may be automatically started after being automatically stopped. In some examples an engine may be automatically started when an operator releases a vehicle brake pedal or depresses an accelerator pedal. If the engine is not being automatically started the engine is being started via an operator directed start since only automatic and operator directed engine starts are permitted. An operator directed start may be initiated by an operator requesting an engine start via an input that has a sole function of requesting an engine start for the operator (e.g., an engine starter switch). When a start is triggered by operator action other than through a dedicated input that has a sole function of requesting a start for an operator, the engine may be determined to be automatically started. For example, if an operator releases a brake pedal, the vehicle may automatically start and not operator directed to start. On the other hand, if the operator turns an engine start key to a start position, it may be determined that the engine is being started via an operator directed start. If method 500 determines the engine is being automatically started, method 500 proceeds to 508. Otherwise, method 500 proceeds to 522.

At 508, method 500 determines a presently engaged transmission gear. In some examples, a transmission gear may be determined to be engaged when a clutch is applied, and the clutch may be applied via supplying oil to the clutch. A clutch may be determined to be applied, and a gear to be engaged, when an oil pressure supplied to the clutch is greater than a threshold pressure. Alternatively, a clutch may be determined to be applied based on the state of a variable stored in the controller. Method 500 proceeds to 510 after the presently selected or engaged gear is determined.

At 510, method 500 determines a state of the vehicle brake. The state of the vehicle brake may be determined to be applied or not applied via a brake pedal sensor such as 154 of FIG. 1. Method 500 proceeds to 512 after the brake state is determined.

At 512, method 500 determines engine torque request. In one example, engine torque request may be determined via interrogating the output of accelerator pedal position sensor 134. The output of the accelerator pedal position sensor can be used to index a table or function that transforms the pedal position sensor output to an engine torque demand. Method 500 proceeds to 514 after the engine torque request is determined.

At 514, method 500 determines engine event number since engine stop. In one example, the engine events may be induction strokes of engine cylinders. In other examples, engine events may be combustion events or exhaust strokes. For example, if an engine is stopped and begins to rotate such that cylinder number one has inducted a fresh charge and cylinder number four is beginning to induct fresh charge, it may be determined that the engine is on a second event. In some examples, the first and subsequent induction strokes may be anticipated from engine position. For example, if engine position is such that cylinder number one of a four cylinder engine having a firing order of 1-3-4-2 is on an intake stroke at engine stop, it may be determined that the engine is at a first event and the second event will follow in cylinder three. In this way, cylinder events may be tracked.

At 516, engine port throttle are adjusted for the automatic start. In one example, a base position for each port throttle of the engine is determined. The base port throttle position may be based on engine temperature. For example, engine temperature may be used to index one or more tables of describing base port throttle positions.

An offset compensating for the presently engaged transmission gear is added to the base port throttle position. In one example, port throttles are opened further when higher gears are engaged (e.g., third gear) as compared to when lower gears are engaged (e.g., first gear). Thus, the base port throttle position is adjusted in response to the transmission gear that is presently engaged.

An offset compensating for the position of the vehicle brake pedal is also added to the base port throttle position. For example, if the brake pedal is depressed to a first position the base port throttle position is adjusted to close the port throttle opening amount to a first position. If the brake pedal is depressed to a second position, requesting additional vehicle brake force as compare to the first position, the based port throttle position is adjusted to close the port throttle opening to a second position less open than the first position. The brake pedal position is used to index a table or function of empirically determined port throttle adjustments. The output of the table or function is added to the base port throttle position.

An offset for compensating for engine torque demand is also added to the base port throttle opening amount. For example, if the accelerator pedal is depressed to a first position the base port throttle position is adjusted to open the port throttle opening amount to a first position. If the accelerator pedal is depressed to a second position, requesting additional engine torque as compared to the first position, the base port throttle position is adjusted to open the port throttle opening to a second position more open than the first position. The accelerator pedal position is used to index a table or function of empirically determined port throttle adjustments. The output of the table or function is added to the base port throttle position.

The base port throttle opening amount may also be adjusted based on a number of engine events. For example, a port throttle of a cylinder may be opened a predetermined amount for each induction event of the cylinder via an offset that can be added to the base port throttle position of the port throttle for each induction event of the cylinder. In another example, a port throttle of a cylinder may be opened a predetermined amount for each induction event of each engine cylinder via an offset that can be added to the base port throttle position of the port throttle for each engine induction event. Additionally, the base port throttle position opening amount can be increased as MAP decreases during engine starting. Further, the positions of port throttles may be adjusted responsive to engine speed during engine starting. For example, if engine speed is greater than desired engine speed, port throttles may be at least partially closed. If engine speed is less than desired engine speed, port throttle may be at least partially opened. It should be mentioned that the predetermined amounts mentioned above may vary depending on the engine event number and the predetermined amounts may be indexed in a table or function of empirically determined offsets amounts. In this way, port throttle position can be adjusted for cylinder events and/or MAP. Method 500 proceeds to 516 after transmission gear, brake state, torque request, and cylinder event number offsets have been added to the base port throttle positions.

Method 500 also adjusts the port throttle position of each port throttle. In some examples the port throttles may be adjusted for every engine event until a predetermined number of engine events are reached. In other examples, the port throttles may be adjusted at predetermined time intervals. The port throttles may be adjusted via adjusting a position of a motor or solenoid, or alternatively the port throttle positions may be pneumatically or hydraulically adjusted. The port throttles are adjusted to positions according to the base port throttle position plus the offsets. Method 500 proceeds to 518 after port throttle positions are adjusted.

At 518, the position of the primary throttle may be adjusted. In one example, the primary throttle position is adjusted based on air flow through the primary throttle. In other examples, the position of the primary throttle may be adjusted based on MAP. Further, the position of the primary throttle may be adjusted according to the engine torque demand. For example, if the engine torque demand increases, the engine air inlet throttle opening can be increased. Method 500 proceeds to 520.

At 520, method 500 judges whether or not the engine is started or at conditions to exit automatic starting port throttle control mode. In one example, the engine is started after engine speed exceeds idle speed. In other examples, method 500 may require engine speed to be within a predetermined speed range for a predetermined amount of time before proceeding to exit. If method 500 judges the engine is started or at conditions to exit automatic starting port throttle control mode, method 500 proceeds to exit. Otherwise, method 500 returns to 508.

At 522, method 500 determines base port throttle positions based on the engine being in neutral or park. When the engine is in neutral or park less inertia may be coupled to the engine so it may be desirable to reduce port throttle base opening amount. In one example, temperature and neutral gear are a basis for indexing a table or function of empirically determined base port throttle positions. The table or function is indexed and base port throttle positions are output. Method 500 proceeds to 524 after the base port throttle positions are determined.

At 524, engine port throttles are adjusted for the operator directed start. The base port throttle positions for the operator directed start may be opened further than for an automatic engine start under similar conditions. The port throttle may be opened further in an operator directed start so that the engine runs up at a faster rate. Further, since the vehicle is known to be in neutral or park, engine speed can increase without transferring engine torque to vehicle wheels. Additionally, the base port throttle position opening amount can be increased as MAP decreases. Further, the positions of port throttles may be adjusted responsive to engine speed. For example, if engine speed is greater than desired engine speed, port throttles may be at least partially closed. If engine speed is less than desired engine speed, port throttles may be at least partially opened.

In some examples the port throttles may be adjusted for every engine event until a predetermined number of engine events are reached. In other examples, the port throttles may be adjusted at predetermined time intervals. Method 500 proceeds to 526 after engine port throttles are adjusted.

At 526, method 500 adjusts the position of the primary throttle. The primary throttle position may be adjusted based on air flow through the primary throttle. In other examples, the position of the primary throttle may be adjusted based on MAP. Further, the position of the primary throttle may be adjusted according to the engine torque demand. Method 500 proceeds to 528 after the primary throttle position is adjusted.

At 528, method 500 judges whether or not the engine is started or at conditions to exit operator directed starting port throttle control mode. The engine may be considered started after engine speed exceeds idle speed. In other examples, method 500 may require engine speed to be within a predetermined speed range for a predetermined amount of time before proceeding to exit. If method 500 judges the engine is started or at conditions to exit operator directed engine starting port throttle control mode, method 500 proceeds to exit. Otherwise, method 500 returns to 524.

In this way, port throttles may be adjusted differently between operator directed engine starts and automatic engine starts so as to improve engine starting. Additionally, port throttles can be adjusted based on transmission gear, number of engine events, and state of vehicle brake to improve engine starting.

As will be appreciated by one of ordinary skill in the art, the method described in FIG. 5 may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the objects, features, and advantages described herein, but is provided for ease of illustration and description. Although not explicitly illustrated, one of ordinary skill in the art will recognize that one or more of the illustrated steps or functions may be repeatedly performed depending on the particular strategy being used.

This concludes the description. The reading of it by those skilled in the art would bring to mind many alterations and modifications without departing from the spirit and the scope of the description. For example, single cylinder, I2, I3, I4, I5, V6, V8, V10, V12 and V16 engines operating on natural gas, gasoline, diesel, or alternative fuel configurations could use the present description to advantage.

The invention claimed:

1. A method of starting an engine, comprising:
   positioning an air inlet throttle for an engine start;
   during an operator directed engine start, positioning a port throttle in a first position, the port throttle positioned downstream of the air inlet throttle in an air intake system of the engine; and
   positioning the port throttle in a second position during an automatic engine start, the automatic engine start not requested directly by an operator, the port throttle opened further during the operator directed start than during the automatic engine start.

2. The method of claim 1, further comprising adjusting the first position of the port throttle during the automatic engine start before an engine idle speed is reached by the engine in response to an operator torque request.

3. The method of claim 2, where adjusting the first position of the port throttle includes increasing an opening amount of the port throttle.

4. The method of claim 1, further comprising adjusting the port throttle in response to engine speed during the automatic engine start.

5. The method of claim 1, further comprising adjusting the port throttle in response to ambient barometric pressure during the automatic engine start.

6. A method of starting an engine, comprising:
   positioning a first port throttle directing air to a first cylinder in a first position during an operator directed engine start; and
   positioning the first port throttle in a second position during an automatic engine start, the automatic engine start not an operator directed engine start, the first port throttle further positioned in response to a presently engaged gear ratio of a transmission.

7. The method of claim 6, further comprising adjusting an air inlet throttle positioned upstream of the first port throttle in response to intake manifold pressure during the automatic engine start.

8. The method of claim 6, where the first port throttle is opened a first opening amount for a first gear and where the first port throttle is opened a second opening amount for a second gear, the first gear a lower gear ratio than the second gear, the second opening amount greater than the first opening amount.

9. The method of claim 6, further comprising positioning a second port throttle directing air to a second cylinder in a third position during the automatic engine start.

10. The method of claim 9, where the first cylinder is a first cylinder to combust an air-fuel mixture from an engine stop, where the second cylinder is a subsequent cylinder to combust an air-fuel mixture from engine stop, and where the first port throttle is opened less than the second port throttle during a first combustion cycle of the engine.

11. The method of claim 6, where the first port throttle is further positioned during the automatic engine start based on barometric pressure.

12. The method of claim 6, further comprising positioning the first port throttle in response to an operator torque request before the engine reaches an idle speed.

13. The method of claim 12, further comprising reducing an opening amount of the first port throttle in response to an operator brake request during the operator torque request.

14. A system for controlling an engine, comprising:
    an engine air intake throttle located along an engine air intake passage;
    a first engine cylinder port throttle located along the engine air intake passage downstream of the engine air intake throttle; and
    a controller including instructions for adjusting a position of the first engine cylinder port throttle to a first position during an operator directed engine start, the controller also including instructions for adjusting the position of the first engine cylinder port throttle to a second position during an automatic engine start, the automatic engine start not directly requested via an operator, the controller including further instructions for adjusting the position of the first engine cylinder port throttle in response to a presently engaged transmission gear.

15. The system of claim 14, further comprising a second engine cylinder port throttle directing air to a different cylinder than the first engine cylinder port throttle.

16. The system of claim 15, including further controller instructions for adjusting a position of the second engine cylinder port throttle different from the position of the first engine cylinder port throttle.

17. The system of claim 14, where the controller includes further instructions for adjusting the first engine cylinder port throttle in response to engine speed during the automatic engine start.

18. The system of claim 14, where the controller includes further instructions for opening the first engine cylinder port throttle further during the operator directed start than during the automatic engine start.

* * * * *